6-ALKYLMORPHINAN DERIVATIVES AND PRODUCTION THEREOF

Yoshiro Sawa and Shin Maeda, Hyogo Prefecture, Japan, assignors to Shionogi & Co., Ltd., Osaka, Japan
No Drawing. Filed Apr. 4, 1963, Ser. No. 270,559
Claims priority, application Japan, Apr. 9, 1962, 37/14,251
5 Claims. (Cl. 260—285)

The present invention relates to 6-alkylmorphinan derivatives and production thereof.

In the term "morphinan" herein employed, there are included all the compounds having a fundamental structure representable by the following plane formula:

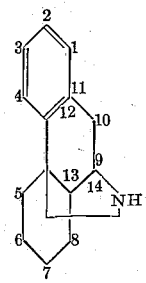

Accordingly, the term "morphinan" means not only normal morphinan (cis-1,3,4,9,10,10a-hexahydro-2H-10,4a-iminoethanophenanthrene) but also isomorphinan (trans-1,3,4,9,10,10a-hexahydro-2H - 10,4a - iminoethanophenanthrene), inclusively. When distinction is necessary, normal morphinan and isomorphinan will be hereinafter designated as "morphinan (cis)" and "morphinan (trans)," respectively. The position-numbering hereinafter employed for the morphinan derivatives is that generally accepted in morphinan chemistry as shown in the above plane formula.

The objective 6-alkylmorphinan derivative in the present invention is representable by the following plane formula:

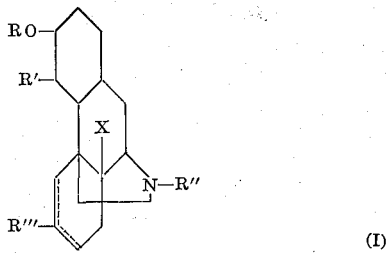

wherein R represents a hydrogen atom, an acyl group such as lower alkanoyl (e.g. acetyl, propionyl, butyryl) or a lower alkyl group (e.g. methyl, ethyl, propyl), R' represents a hydrogen atom, an aryloxy group (e.g. phenyloxy, naphthyloxy) or a substituted aryloxy group (e.g. substituted phenyloxy, substituted naphthyloxy) wherein the substituent is lower alkyl (e.g. methyl, ethyl, propyl), lower alkoxy (e.g. methoxy, ethoxy, propoxy), nitro or amino, R'' represents a hydrogen atom, a lower alkyl group (e.g. methyl, ethyl, propyl) or an ar(lower)alkyl group (e.g. benzyl, phenethyl), R''' represents a lower alkyl group (e.g. methyl, ethyl, propyl), X represents a hydrogen atom, a hydroxyl group or an acyloxy group such as lower alkanoyloxy (e.g. acetyloxy, propionyloxy, butyryloxy) and a double bond exists between the 6-position and the adjacent position thereto and shows various pharmacological activities such as analgesic activity and antitussive activity.

Accordingly, a basic object of the present invention is to embody the 6-alkylmorphinan derivative of Formula I. Another object of the invention is to embody the pharmacologically active 6-alkylmorphinan (I). A further object of the invention is to embody a process for preparing the 6-alkylmorphinan (I). These and other objects will be apparent to those conversant with the art to which the present invention pertains from the subsequent description.

The process of the present invention is illustratively represented by the following scheme:

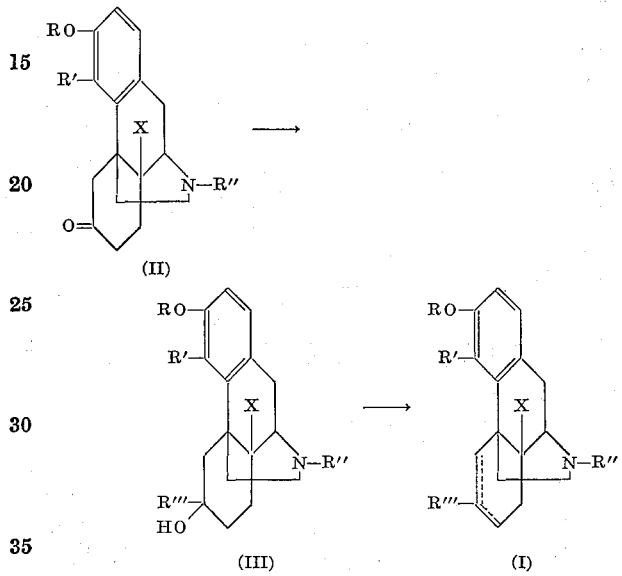

wherein R, R', R'', R''' and X each has the same significance as designated above and, in Formula I, a double bond exists between the 6-position and the adjacent position thereto.

As the starting material, there may be used the optically active or racemic 6-oxomorphinan of Formula II.

According to the process of the present invention the starting 6-oxomorphinan (II) is subjected to alkylation, followed by dehydration of the resultant 6-alkyl-6-hydroxymorphinan (III) to the objective 6-alkylmorphinan (I). The alkylation can be accomplished by treating the 6-oxomorphinan (II) with an alkylating agent such as metallic alkyl compounds, preferably lower alkyl metal (e.g. methyl lithium, ethyl lithium, propyl lithium, methyl sodium, ethyl sodium, methyl potassium, ethyl potassium, triethyl aluminum, tripropyl aluminum) or lower alkyl metal halide (e.g. methyl magnesium chloride, ethyl magnesium bromide, methyl magnesium iodide, ethyl magnesium iodide, propyl magnesium iodide, diethyl aluminum chloride), in an inert organic solvent medium (e.g. ether, tetrahydrofuran, dioxane, benzene, toluene) usually at a temperature from room temperature (15 to 30° C.) to reflux temperature, followed by treating the reaction mixture substantially with water. In the alkylation reaction, if any, such a group as 3-acyloxy and 14-acyloxy may be simultaneously hydrolyzed to a hydroxyl group. However, the intended alkylation at the 6-position is not blocked by this side reaction. The subsequent dehydration is effected by treating the resulting 6-alkyl-6-hydroxymorphinan (III) with a conventional dehydrating agent (e.g. thionyl chloride, phosphorus trichloride, phosphorus oxychloride, phosphorus tribromide) in an organic base medium (e.g. pyridine, picoline, dimethylaniline) usually at a temperature not higher than room temperature (15 to 30° C.).

The objective 6-alkylmorphinans (I) occur in optically active form as well as in racemic mixture and these are all within the scope of the present invention.

The 6-alkylmorphinans (I) form acid addition salts with organic and inorganic acids. Illustrative acid addition salts include the hydrohalide (e.g. hydrochloride, hydrobromide, hydroiodide), sulfate, phosphate, nitrate, tartrate, salicylate, benzoate, malate, citrate, acetate, etc.

The thus-produced 6-alkylmorphinans (I) and acid addition salts thereof exhibit various pharmacological activities such as analgesic activity and antitussive activity. For instance, the analgesic activity ($ED_{50}$, milligram(s) per kilogram of body weight) and the toxicity ($LD_{50}$, milligram(s) per kilogram of body weight) of some 6-alkylmorphinans according to the present invention are shown in the following Table I:

TABLE I

| Compound | Analgesic activity ($ED_{50}$, mg./kg.) | Toxicity ($LD_{50}$, mg./kg.) |
|---|---|---|
| A mixture of (—)-3-methoxy-6, N-dimethyl-$\Delta^5$-morphinan (cis) and (—)-3-methoxy-6,N-dimethyl-$\Delta^6$-morphinan (cis) | 23.2 | 177 |
| (—)-3-Methoxy-6,N-dimethyl-14-hydroxy-$\Delta^5$-morphinan (cis) | 30.2 | 286 |
| (—)-3-Methoxy-6,N-dimethyl-14-hydroxy-$\Delta^6$-morphinan (cis) | 30.7 | 333 |

NOTE: The analgesic activity was observed by the Haffner-Hesse Method [Hesse: Arch. exp. Path. u. Pharm., Vol. 158, p. 233 (1930)] in mice. The toxicity was tested by the intravenous administration of the tested compound to mice.

Further, for instance, a mixture of (—)-3-methoxy-6,N-dimethyl-$\Delta^5$-morphinan (cis) and (—)-3-methoxy-6,N-dimethyl-$\Delta^6$-morphinan (cis) showed 3.4 times the antitussive activity of codeine in the test using guinea pigs according to a conventional method [Winter et al.: J. Exper. Med., vol. 101, p. 17 (1955)]. Accordingly, they are useful as analgesic and/or antitussive agents.

Practical and presently preferred embodiments of the present invention are illustrated by the following examples. In the examples, abbreviation each have conventional meanings, e.g. mg.=milligram(s), g.=gram(s), ml.=millilitre(s), ° C.=degrees centigrade.

*Example 1*

Preparation of a mixture of (—)-3-methoxy-6,N-dimethyl-$\Delta^5$-morphinan (cis) and (—)-3-methoxy-6,N-dimethyl-$\Delta^6$-morphinan (cis):

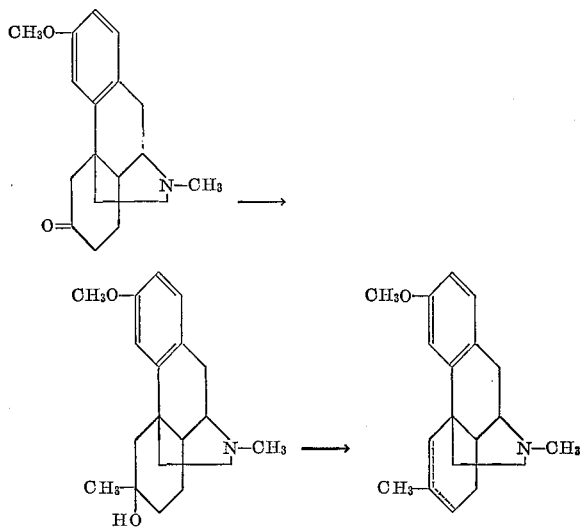

To a solution of (—)-3-methoxy-6-oxo-N-methylmorphinan (cis) (1.43 g.) in anhydrous ether (560 ml.), there is added Grignard reagent prepared from metallic magnesium (0.39 g.), methyl iodide (2.12 g.) and anhydrous ether (30 ml.), and the resultant mixture is allowed to stand at 27 to 29° C. for 5 hours and then at room temperature (15 to 30° C.) overnight. After addition of water (5 ml.) to the reaction mixture, ether and water are evaporated. The residue is dissolved in ether and the insoluble substance removed. The ether solution is treated with hydroxylamine and chromatographed on alumina to eliminate impurities. The resultant ether solution is evaporated and crystallized from ether to give (—)-3-methoxy-6-hydroxy-6,N-dimethylmorphinan (cis) (0.41 g.) as crystals melting at 111 to 112° C. $[\alpha]_D^{25}$ —44.6° (2.012% ethanol).

*Analysis.*—Calcd. for $C_{19}H_{27}O_2N$: C, 75.71; H, 9.03; N, 4.65. Found: C, 76.00; H, 9.25; N, 4.83.

To a solution of (—)-3-methoxy-6-hydroxy-6,N-dimethylmorphinan (cis) (9.04 g.) prepared above in pyridine (10 ml.), there is added dropwise thionyl chloride (8.6 g.) in about 10 minutes at 0 to 5° C., and the resultant mixture is stirred for 20 minutes at the same temperature. The reaction mixture is poured onto ice water (300 g.) and neutralized with sodium bicarbonate (18 g.). The pyridine is removed azeotropically at a temperature lower than 60° C. under reduced pressure. After pyridine odor is lost, the resulting substance is shaken with ether. The ether extract is washed with water, dried, evaporated and crystallized from acetone to give a mixture of (—)-3-methoxy-6,N-dimethyl-$\Delta^5$-morphinan (cis) and (—)-3-methoxy-6,N-dimethyl-$\Delta^6$-morphinan (cis) (7.80 g.) as crystals melting at 86 to 87° C. $[\alpha]_D^{27}$ —21.3° (ethanol).

*Analysis.*—Calcd. for $C_{19}H_{25}ON$: C, 63.72; H, 7.21; N, 3.23. Found: C, 63.26; H, 7.49; N, 3.04.

The compound obtained above is treated with tartaric acid and crystallized from ethanol to give a mixture of (—)-3-methoxy-6,N-dimethyl-$\Delta^5$-morphinan (cis) tartrate and (—)-3-methoxy-6,N-dimethyl-$\Delta^6$-morphinan (cis) tartrate as crystals melting at 187 to 188° C.

The starting material of this example, (—)-3-methoxy-6-oxo-N-methylmorphinan (cis), is a known compound [Sawa et al.: Tetrahedron, vol. 15, p. 154 (1961)].

*Example 2*

Preparation of a mixture of (—)-3-methoxy-6,N-dimethyl-$\Delta^5$-morphinan (cis) and (—)-3-methoxy-6,N-dimethyl-$\Delta^6$-morphinan (cis):

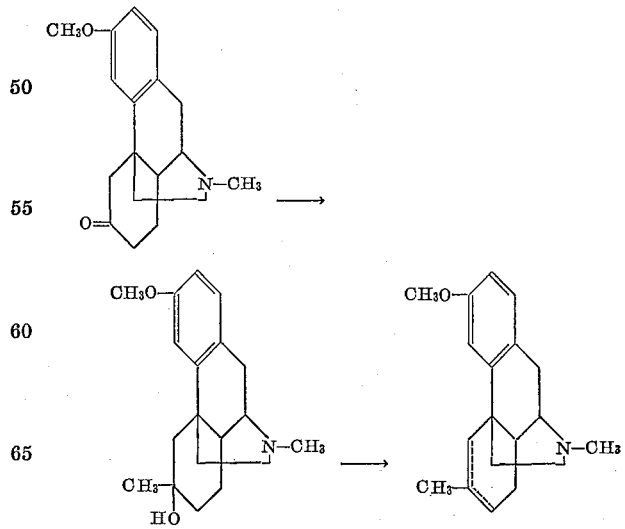

To a solution of metallic lithium (1.53 g.) in anhydrous ether (80 ml.), there is dropwise added a solution of methyl iodide (14.2 g.) in anhydrous ether (30 ml.) at a temperature lower than —10° C. in nitrogen stream for about 1 hour. To the resultant ethereal solution of methyl lithium, there is dropwise added a solution of (—)-3-methoxy-6-oxo-N-methylmorphinan (cis) (14.3 g.) in anhydrous benzene (600 ml.) at −5 to 0° C. in about 10 minutes. The resultant mixture is stirred for 1 hour at 5 to 10° C. After gradual addition of water (50 ml.), the reaction mixture is washed with 4% sodium hydroxide and then water, evaporated and crystallized from ether to give (—)-3-methoxy-6-hydroxy-6,N - dimethylmorphinan (cis) (13.77 g.) as crystals melting at 111 to 112° C.

The thus prepared (—)-3-methoxy-6-hydroxy-6,N-dimethylmorphinan (cis) is reacted with thionyl chloride in pyridine and treated as in Example 1 to produce a mixture of (—)-3-methoxy-6,N-dimethyl-$\Delta^5$-morphinan (cis) and (—)-3-methoxy-6,N-dimethyl-$\Delta^6$-morphinan (cis).

*Example 3*

Preparation of (—)-3-methoxy - 6,N - dimethyl-14-hydroxy-$\Delta^5$-morphinan (cis) and (—)-3-methoxy-6,N-dimethyl-14-hydroxy-$\Delta^6$-morphinan (cis).:

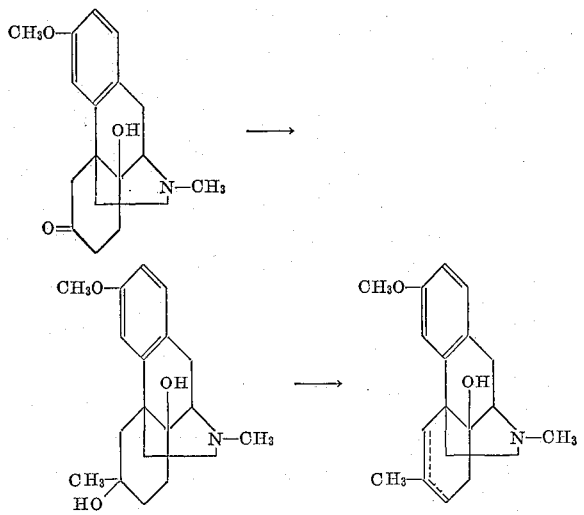

To a solution of methyl lithium prepared from metallic lithium (0.7 g.) and methyl iodide (7.1 g.) in tetrahydrofuran (30 ml.), there is dropwise added a solution of (—)-3-methoxy - 6 - oxo - 14 - hydroxy-N-methylmorphinan (cis) (1 g.) in tetrahydrofuran (30 ml.) in nitrogen stream, and the resultant mixture is stirred for 5 hours at room temperature (15 to 30° C.). The reaction mixture is combined with ice-water (50 g.) and tetrahydrofuran removed by distillation under reduced pressure. The water layer is shaken with dichloromethane. The dichloromethane extract is evaporated and the residue dissolved in ether. After removal of the insoluble substance by filtration, the filtrate is evaporated. The residue is heated with hydroxylamine hydrochloride (0.1 g.) and sodium acetate (0.15 g.) in water (5 ml.) at 100° C. for 10 minutes. After cooling, the reaction mixture is neutralized with ammonia-water and shaken with dichloromethane. The dichloromethane layer is evaporated, dissolved in ether and poured onto an alumina column (9 g.). The eluate with ether evaporated to give (—)-3-methoxy-6,14-dihydroxy-6,N-dimethylmorphinan (cis) (315 mg.) as a solid melting at 107 to 109° C. $[\alpha]_D^{24}$ −48.2° (1% chloroform).

*Analysis.*—Calcd. for $C_{19}H_{27}O_3N$: C, 71.89; H, 8.57; N, 4.41. Found: C, 71.86; H, 8.57; N, 4.37.

To a solution of (—)-3-methoxy-6,14-dihydroxy-6,N-dimethylmorphinan (cis) (2.38 g.) prepared above in pyridine (25 ml.), there is added thionyl chloride (3.6 g.) at −10° C., and the resultant solution is stirred for 20 minutes at room temperature (15 to 30° C.). The reaction mixture is poured onto ice-water (50 g.), made to alkalinity and the pyridine removed by distillation under reduced pressure. The resultant product is shaken with dichloromethane and the dichloromethane layer separated and evaporated to give a crude mixture of (—)-3-methoxy-6,N-dimethyl-14-hydroxy - $\Delta^5$ - morphinan (cis) and (—)-3-methoxy-6,N - dimethyl-14-hydroxy-$\Delta^6$-morphinan (cis) (2.2 g.) as a solid melting at 100 to 110° C. The mixture is treated with perchloric acid in ethanol and fractionally crystallized to give (—)-3-methoxy-6,N-dimethyl-14-hydroxy-$\Delta^5$-morphinan (cis) perchloride (1.59 g.) as crystals melting at 240 to 242° C. and (—)-3-methoxy-6,N-dimethyl-14-hydroxy-$\Delta^6$-morphinan (cis) perchloride (0.58 g.) as crystals melting at 140 to 141° C. (decomp.). Each of the perchlorides is treated with a mixture of ammonia-water and dichloromethane to give the corresponding free base.

(—)-3-Methoxy-6,N-dimethyl - 14 - hydroxy-$\Delta^5$-morphinan (cis). M.P., 122 to 124° C. $[\alpha]_D^{24}$ −53° (1% chloroform).

*Analysis.*—Calcd. for $C_{19}H_{25}O_2N$: C, 76.22; H, 8.42; N, 4.68. Found: C, 76.61; H, 8.60; N, 4.91.

(—)-3-Methoxy-6,N - dimethyl - 14 - hydroxy-$\Delta^6$-morphinan (cis). M.P., 131 to 134° C. $[\alpha]_D^{24}$ −181° (1% chloroform).

*Analysis.*—Calcd. for $C_{19}H_{25}O_2N$: C, 76.22; H, 8.42; N, 4.68. Found: C, 76.40; H, 8.52; N, 4.53.

The starting material of this example, (—)-3-methoxy-6-oxo-14-hydroxy-N-methylmorphinan (cis), is prepared from thebaine according to the following scheme:

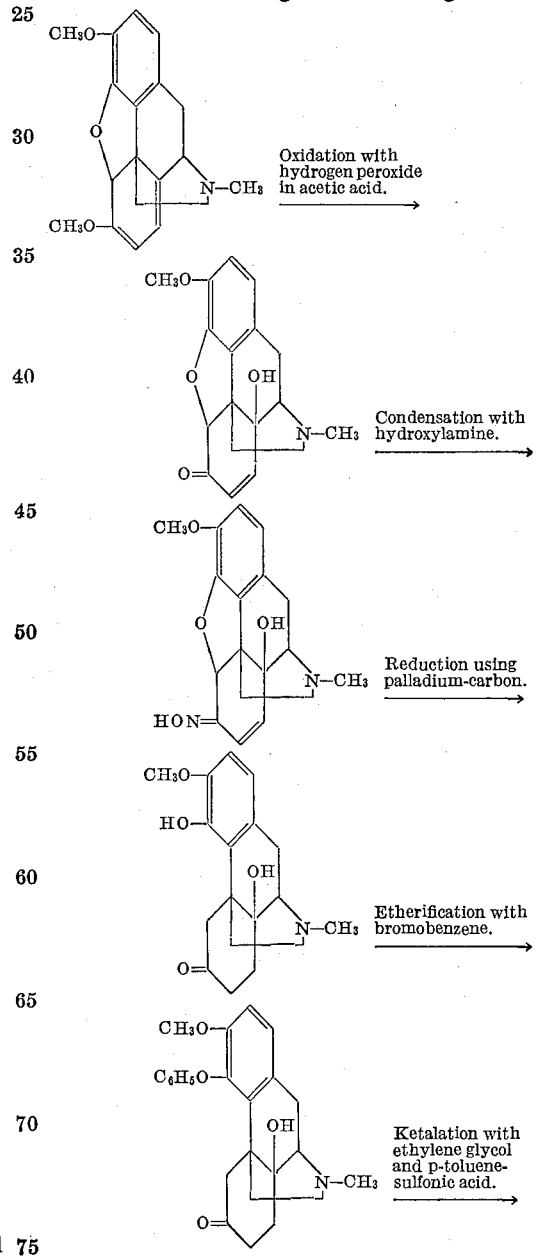

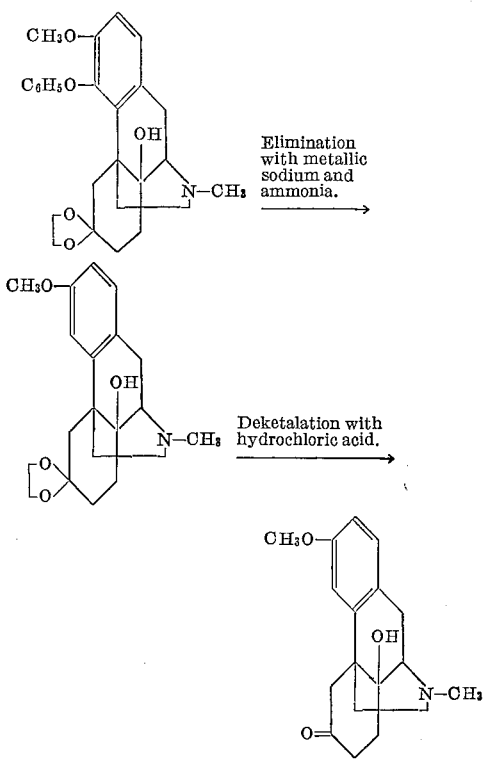

*Example 4*

Preparation of (-) - 3 - methoxy-6,N-dimethyl-14-hydroxy-Δ⁵-morphinan (cis) and (-)-3-methoxy-6,N-dimethyl-14-hydroxy-Δ⁶-morphinan (cis):

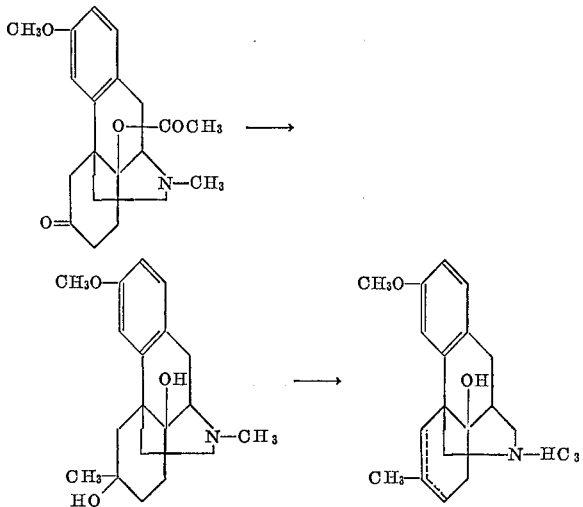

To a solution of methyl lithium prepared from metallic lithium (8 g.) and methyl iodide (72 g.) in ether (400 ml.), there is added dropwise a solution of (—)-3-methoxy-6-oxo-14-acetyloxy-N-methylmorphinan (cis) (8 g.) in ether (80 ml.), and the resultant mixture is stirred for 7.5 hours at room temperature (15 to 30° C.) in nitrogen stream. After addition of ice-water (400 g.) to the reaction mixture, the ether layer is separated. The water layer is shaken with ether. The ether extract is combined with the above separated ether layer and the solvent removed. The residue (7.4 g.) is dissolved in ether, chromatographed on alumina (120 g.) and eluted with ether. Removal of the solvent from the eluate gives (—)-3-methoxy-6,14-dihydroxy - 6,N - dimethylmorphinan (cis) (6.55 g.).

The thus prepared (—)-3-methoxy-6,14-dihydroxy-6,N-dimethylmorphinan (cis) is reacted wtih thionyl chloride in pyridine and treated as in Example 3 to produce (—)-3-methoxy - 6,N-dimethyl-14-hydroxy-Δ⁵-morphinan (cis) and (—)-3-methoxy-6,N-hydroxy-Δ⁶-morphinan (cis).

The starting material of this example, (—)-3-methoxy-6-oxo-14-acetyloxy-N-methylmorphinan (cis), is prepared by subjecting (—)-3-methoxy-6-oxo-14-hydroxy-N-methylmorphinan (cis) [cf. Example 3 of this specification] to acetylation in a per se conventional manner.

What is claimed is:

1. A mixture of 3-lower alkoxy-6,N-di(lower)alkyl-Δ⁵-morphinan and 3-lower alkoxy-6,N-dimethyl-Δ⁶-morphinan.

2. A mixture of (—)-3-methoxy-6,N-dimethyl-Δ⁵-morphinan (cis) and (—)-3-methoxy-6,N-dimethyl-Δ⁶-morphinan (cis).

3. 3-lower alkoxy-6,N-di(lower)alkyl-14-hydroxy-Δ⁵-morphinan.

4. (—)-3-methoxy - 6,N - dimethyl-14-hydroxy-Δ⁵-morphinan (cis).

5. (-) - 3-methoxy-6-hydroxy-6,N-dimethylmorphinan (cis).

References Cited by the Examiner

UNITED STATES PATENTS

| | | | |
|---|---|---|---|
| 2,510,732 | 6/1950 | Homeyer et al. | 260—285 |
| 2,694,067 | 11/1954 | Payne et al. | 260—285 |
| 2,732,375 | 1/1956 | Gates | 260—285 |
| 2,766,245 | 10/1956 | Gates | 260—285 |
| 3,085,091 | 4/1963 | Sawa et al. | 260—285 |

OTHER REFERENCES

Gates et al.: J. Am. Chem. Soc., vol. 80, pp. 1186–1194 (1958).

Hartung: Ind. Eng. Chem., vol. 37, pp. 126–127 (1945).

ALEX MAZEL, *Primary Examiner.*

JOHN D. RANDOLPH, HENRY R. JILES, *Examiners.*

DONALD G. DAUS, D. M. KERR, *Assistant Examiners.*